(12) United States Patent
Suzuki

(10) Patent No.: US 6,400,412 B1
(45) Date of Patent: Jun. 4, 2002

(54) VIDEO SIGNAL PROCESSING APPARATUS WITH TIME ADJUSTMENT OF DIGITAL CHROMINANCE SIGNAL

(75) Inventor: Toshihiko Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/127,837

(22) Filed: Aug. 4, 1998

(30) Foreign Application Priority Data

Aug. 22, 1997 (JP) ............................................ 09-240251

(51) Int. Cl.[7] .............................. H04N 9/64; H04N 9/77
(52) U.S. Cl. ........................ 348/572; 348/689; 348/712; 348/713
(58) Field of Search ................................. 348/572, 575, 348/607, 608, 609, 624, 690, 689, 712, 713, 723, 725; H04N 5/21, 5/14, 9/77, 9/64

(56) References Cited

U.S. PATENT DOCUMENTS 5,084,700 A * 1/1992 Christopher ................. 348/572
6,057,891 A * 5/2000 Guerin ......................... 348/572

* cited by examiner

Primary Examiner—Sherrie Hsia
(74) Attorney, Agent, or Firm—Robin, Blecker & Daley

(57) ABSTRACT

A video signal processing apparatus having first and second analog/digital converters for converting imputted analog luminance and chrominance component signals into digital luminance and chrominance component signal. Frequency band limiting filters, disposed on a pre-stage of the first and second analog/digital converters, limit a frequency band of the analog luminance and chrominance component signals, the chrominance component signal frequency band limiting filter having a group delay characteristic different from a group delay characteristic of the luminance component signal frequency band limiting filter by a predetermined delay time. A time adjustment circuit adjusts the timing of the digital chrominance signal to match with the digital luminance signal.

10 Claims, 10 Drawing Sheets

VIDEO SIGNAL PROCESSING APPARATUS WITH TIME ADJUSTMENT OF DIGITAL CHROMINANCE SIGNAL

BACKGROUND OF THE INVENTION

1. Field of the Invention

The present invention relates to a video signal processing apparatus for converting an analog video signal composed of an analog luminance component signal and an analog chrominance component signal into a digital video signal and processing the digital video signal and for converting the processed digital video signal into a digital video signal and outputting the digital video signal.

2. Description of Related Art

In recent years, digital video apparatuses for digitizing analog video signals to record the digital signals on tapes or disks and reproduce the digital signals therefrom have begun to popularly spread. More specifically, digital video cameras and digital video disks are known as typical digital video apparatuses.

These digital video apparatuses cope with not only recording/reproduction of digital video signals but also recording/reproduction of conventional analog video signals.

FIG. 1 is a block diagram showing the arrangement of a conventional video signal processing apparatus for converting an analog video signal into a digital video signal. Referring to FIG. 1, reference numeral 103a denotes a low-pass filter (LPF); 123a, a band-pass filter (BPF); 104a and 125a, clamping circuits; and 105a and 126a, A/D converters.

In the video signal processing apparatus shown in FIG. 1, input signals 101a and 121a are an analog luminance (Y) signal and an analog chrominance (C) signal, respectively. After the luminance signal 101a is gain-controlled by an amplifier 102a to have a predetermined signal level, the luminance signal 103aa is subjected to band limit by the low-pass filter 103a.

This LPF 103a has an amplitude attenuation characteristic of about −12 dB at a frequency of ½ is on the basis of a sampling clock frequency fs of an A/D converter, and also has a group delay time YDLY (nS) in a passing band (see FIG. 3).

A luminance signal 103ba subjected to the predetermined band limit by the LPF 103a is inputted to the clamping circuit 104a. Then, a signal potential of the luminance signal 103ba is set by the clamping circuit 104a to be appropriate to the input range of the A/D converter 105a of the next stage. More specifically, a clamping operation of the clamping circuit 104a is performed such that, even if the average luminance level (APL) of a video signal varies, a pedestal level (black level) of the video signal serving as a reference becomes a fixed DC potential.

The A/D converter 105a converts an analog luminance signal 108a outputted from the clamping circuit 104a into a digital luminance signal 106a at a resolution of, e.g., 8 bits.

Similarly, after the chrominance signal 121a is a gain-controlled by an amplifier 122a to have a predetermined signal level the chrominance signal 123aa is subjected to band limit by the band-pass filter (BPF) 123a.

A chrominance signal in the NTSC system has fsc=3.58 MHz, and a chrominance signal in the PAL system has fsc=4.43 MHz. The BPF 123a has a group delay time CDLY (nS) in a passing band (see FIG. 4). A chrominance signal 123ba subjected to band limit by the BPF 123a is subjected to delay correction by a delay circuit 124a until the chrominance signal 123ba has the same timing as that of the luminance signal 103ba.

Thereafter, a signal potential of a chrominance signal 130a outputted from the delay circuit 124a is set by the clamping circuit 125a to be appropriate to the input range of the A/D converter 126a. As in the luminance signal system, an analog chrominance signal 129a is converted into a digital chrominance signal 127a by the A/D converter 126a.

Here, in a signal processing system for converting an analog video signal into a digital video signal, the characteristics of an analog filter for suppressing aliasing noise generated in sampling by the A/D converter 105a are important factors.

In the conventional signal processing system shown in FIG. 1, when the sampling frequency of the luminance signal 101a is set to be, e.g., 13.5 MHz, in order to keep the quality (frequency characteristic and pulse response characteristic) of a signal component in the passing band good, a group delay characteristic of about 300 to 800 nS is generally set by setting a cutoff frequency or the like.

Since the chrominance signal 121a has a narrow signal band, the BPF 123a is generally constituted by a BPF having the characteristics as shown in FIG. 4. However, since the group delay time CDLY of the BPF 123a is shorter than the group delay time YDLY of the LPF 103a for a luminance signal, the delay circuit 124a must be provided to make the delay time of the chrominance signal 121a equal to the delay time of the luminance signal 101a.

However, the presence of an analog delay circuit for adjusting signal delay, as in the conventional signal processing system, disadvantageously gives bad influence on suppressing the variations of delay timings of the luminance signal and the chrominance signal and assuring the precision of the delay timings, and degrades the quality of the signals, e.g., an S/N ratio or the like.

In addition, an input/output signal processing system for an analog signal in a digital video apparatus is advantageously constituted by a compact system at high precision and low cost by constituting peripheral circuits by ICs. However, from the viewpoints of the circuit scale and the power consumption, it is disadvantageous to constitute a delay circuit for correcting the timings of a luminance signal and a chrominance signal by an analog circuit.

BRIEF SUMMARY OF THE INVENTION

It is an object of the present invention to provide a video signal processing apparatus capable of solving the above problems.

It is another object of the present invention to provide a video signal processing apparatus capable of reducing the variations of delay timings of a luminance component signal and a chrominance component signal and improving the precision of the delay timings.

To attain the above objects, in accordance with an aspect of the present invention, there is provided a video signal processing apparatus for converting an analog video signal composed of an analog luminance component signal and an analog chrominance component signal into a digital video signal and processing the digital video signal, which comprises (i) first analog/digital conversion means for inputting an analog luminance component signal and converting the inputted analog luminance component signal into a digital luminance component signal and for outputting the digital luminance component signal, (ii) second analog/digital conversion means for inputting an analog chrominance component signal and converting the inputted analog chrominance component signal into a digital chrominance component signal and for outputting the digital chrominance component signal, (iii) luminance component signal frequency band limiting means, disposed on a pre-stage of the first analog/digital conversion means, for limiting a frequency band of the analog luminance component signal to be inputted to the first analog/digital conversion means and for supplying the frequency-band-limited analog luminance component signal to the first analog/digital conversion means, (iv) chrominance component signal frequency band limiting means, disposed on a pre-stage of the second analog/digital conversion means, for limiting a frequency band of the analog chrominance component signal to be inputted to the second analog/digital conversion means and for supplying the frequency-band-limited analog chrominance component signal to the second analog/digital conversion means, the chrominance component signal frequency band limiting means having a group delay characteristic different from a group delay characteristic of the luminance component signal frequency band limiting means by a predetermined delay time, and (v) digital signal processing means for individually processing, as digital signals, the digital luminance component signal outputted from the first analog/digital conversion means and the digital chrominance component signal outputted from the second analog/digital conversion means.

It is still another object of the present invention to provide a video signal processing apparatus capable of assuring the signal quality, such as an S/N ratio, and achieving low cost, space saving, and a reduction in power consumption.

To attain the above object, in accordance with another aspect of the present invention, there is provided a video signal processing apparatus for processing, as a digital signal, a digital video signal composed of a digital luminance component signal and a digital chrominance component signal and for converting the processed digital video signal into an analog video signal and outputting the analog video signal, which comprises (i) digital signal processing means for individually processing, as digital signals, the digital luminance component signal and the digital chrominance component signal and outputting the processed digital luminance component signal and the processed digital chrominance component signal, (ii) first digital/analog conversion means for inputting the digital luminance component signal outputted from the digital signal processing means and converting the inputted digital luminance component signal into an analog luminance component signal and for outputting the analog luminance component signal, (iii) second digital/analog conversion means for inputting the digital chrominance component signal outputted from the digital signal processing means and converting the inputted digital chrominance component signal into an analog chrominance component signal and for outputting the analog chrominance component signal, (iv) luminance component signal frequency band limiting means, disposed on a post-stage of the first digital/analog conversion means, for limiting a frequency band of the analog luminance component signal outputted from the first digital/analog conversion means and for outputting the frequency-band-limited analog luminance component signal, (v) chrominance component signal frequency band limiting means, disposed on a post-stage of the second digital/analog conversion means, for limiting a frequency band of the analog chrominance component signal outputted from the second digital/analog conversion means and for outputting the frequency-band-limited analog chrominance component signal, the chrominance component signal frequency band limiting means having a group delay characteristic different from a group delay characteristic of the luminance component signal frequency band limiting means by a predetermined delay time, and (vi) correction means for correcting a difference in delay time between the analog luminance component signal outputted from the luminance component signal frequency band limiting means and the analog chrominance component signal outputted from the chrominance component signal frequency band limiting means caused by the difference in group delay characteristic between the luminance component signal frequency band limiting means and the chrominance component signal frequency band limiting means.

These and further objects and features of the present invention will be apparent from the following detailed description of preferred embodiments thereof taken in conjunction with the accompanying drawings.

DETAILED DESCRIPTION OF THE INVENTION

Hereinafter, preferred embodiments of the present invention will be described in detail with reference to the drawings.

[First Embodiment]

Figure 1:
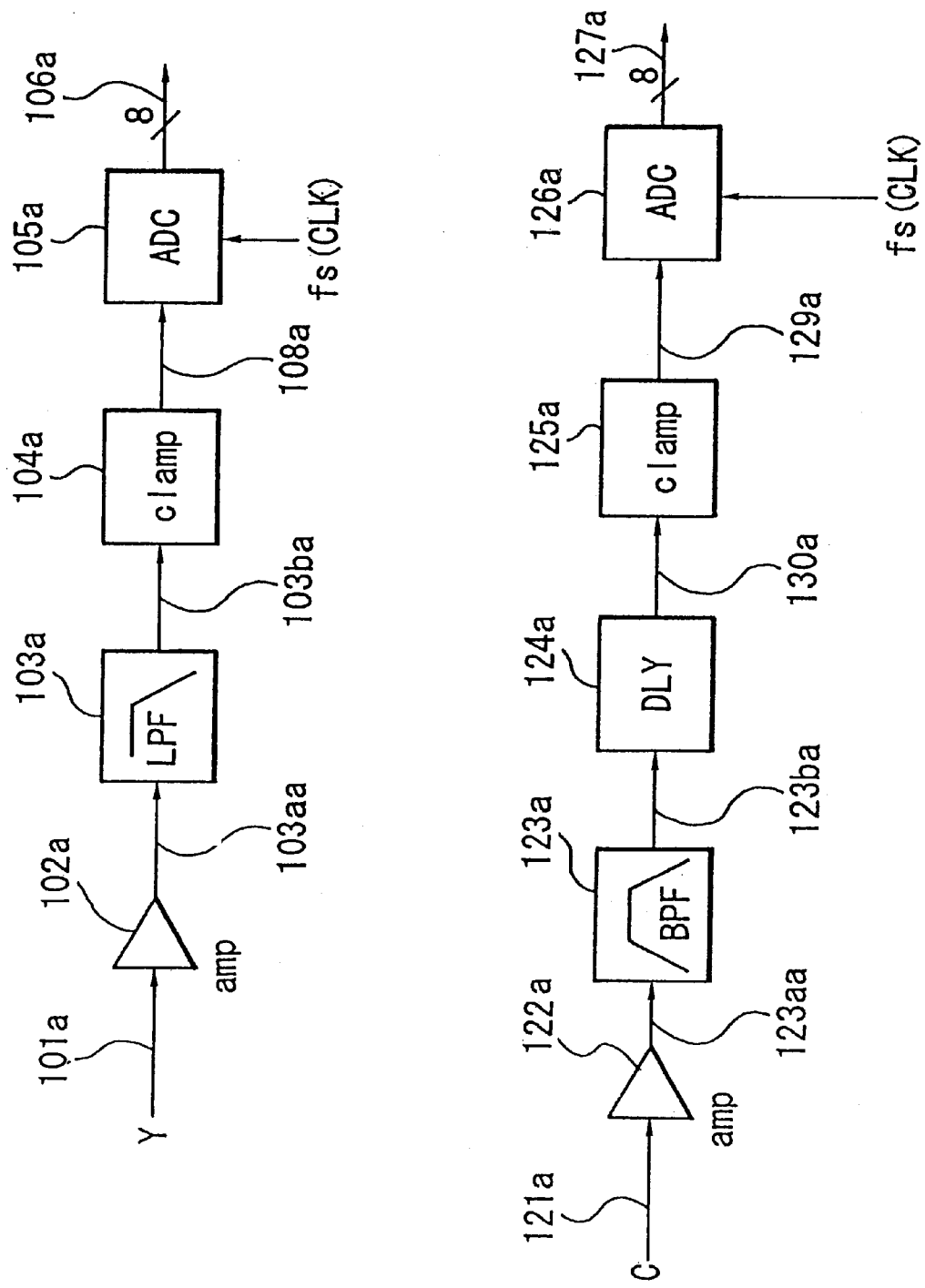
FIG. 1 is a block diagram showing the arrangement of a conventional video signal processing apparatus.
Figure 2:
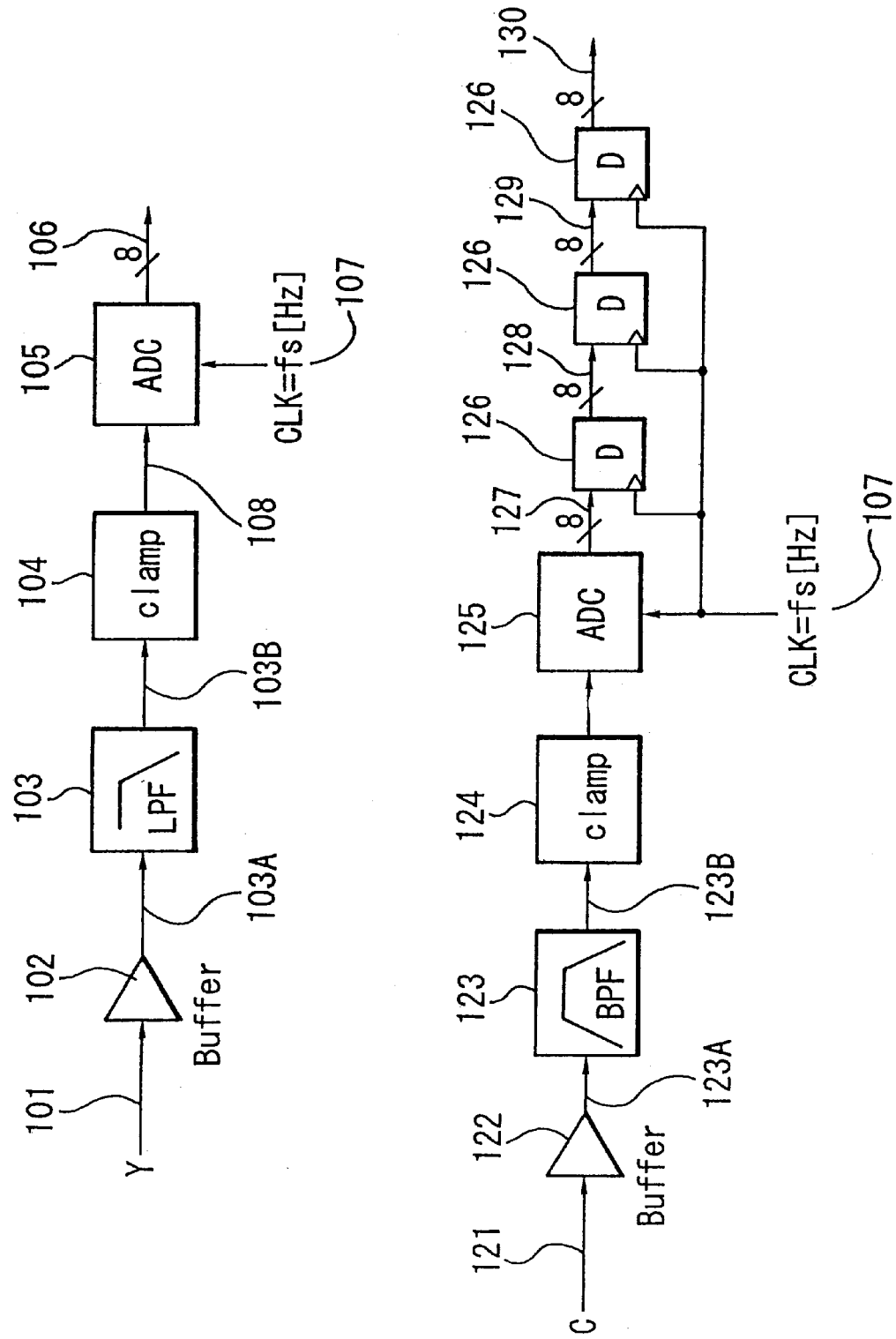
FIG. 2 is a block diagram showing the arrangement of a video signal processing apparatus according to a first embodiment of the present invention.

First, the arrangement and operation of a recording unit of a video signal processing apparatus will be described below. FIG. 2 is a block diagram showing the arrangement of a video signal processing apparatus according to a first embodiment of the present invention. Referring to FIG. 2, reference numeral 126 denotes three D flip-flops which are connected in series with each other to constitute a shift register.

Input signals 101 and 121 are an analog luminance (Y) signal and an analog chrominance (C) signal, respectively, which are gain-controlled by amplifiers 102 and 122 to have predetermined levels, respectively.

Figure 3:
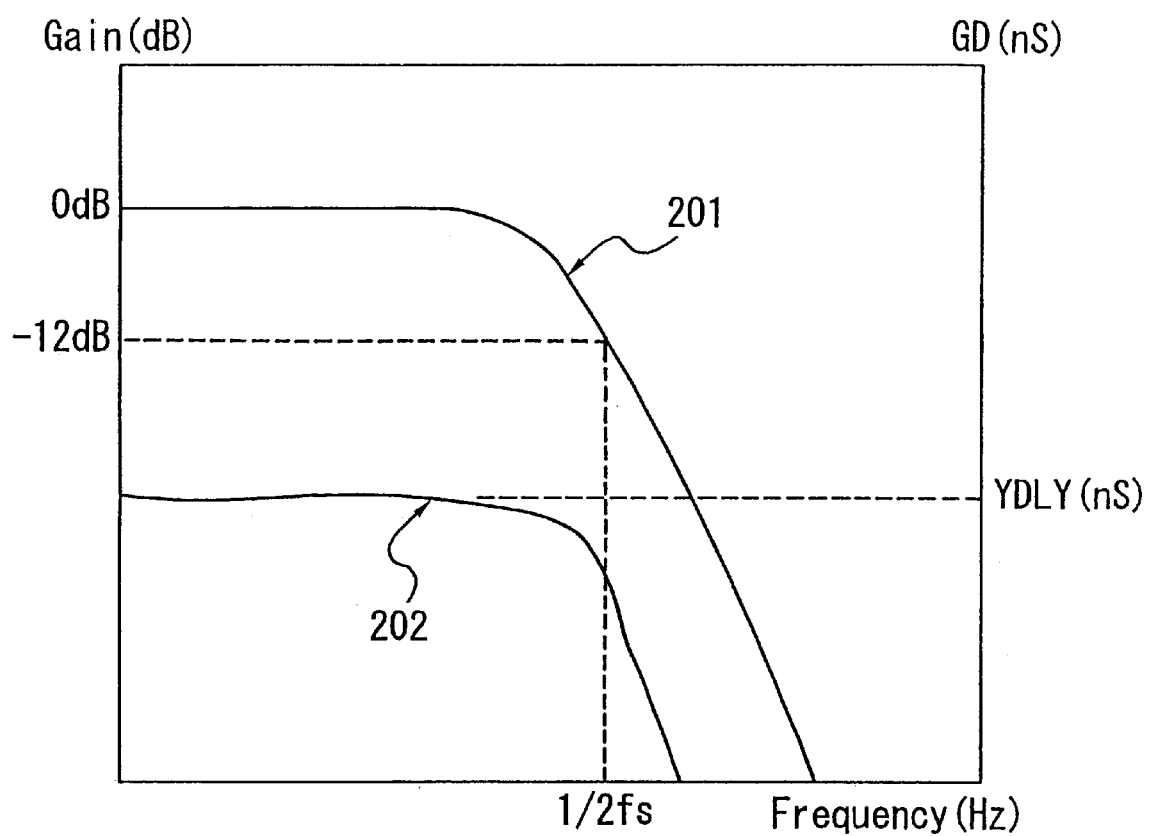
FIG. 3 is a graph showing the characteristic of a low-pass filter (LPF).

A luminance signal 103A gain-controlled by the amplifier 102 is subjected to band limit by an LPF 103. FIG. 3 is a graph showing the characteristic of the LPF 103. Referring to FIG. 3, reference numeral 201 denotes an amplitude characteristic (Gain), and reference numeral 202 denotes a group delay characteristic (GD). The LPF 103 has an amplitude attenuation characteristic of about −12 dB at a frequency of ½ fs on the basis of a sampling clock frequency fs of an A/D converter 105. A group delay time of the LPF 103 in a passing band is YDLY (nS).

The signal potential of a luminance signal 103B subjected to the predetermined band limit by the LPF 103 is set by a clamping circuit 104 such that the luminance signal 103B is appropriate to the input range of an A/D converter 105 serving as the next stage. More specifically, a clamping operation of the clamping circuit 104 is performed such that, even if the average luminance level (APL) of a video signal varies, a pedestal level (black level) of the video signal serving as a reference is equal to a fixed DC potential. The A/D converter 105 converts a luminance signal 108 outputted from the clamping circuit 104 from an analog signal into a digital signal at a resolution of, e.g., 8 bits.

Figure 4:
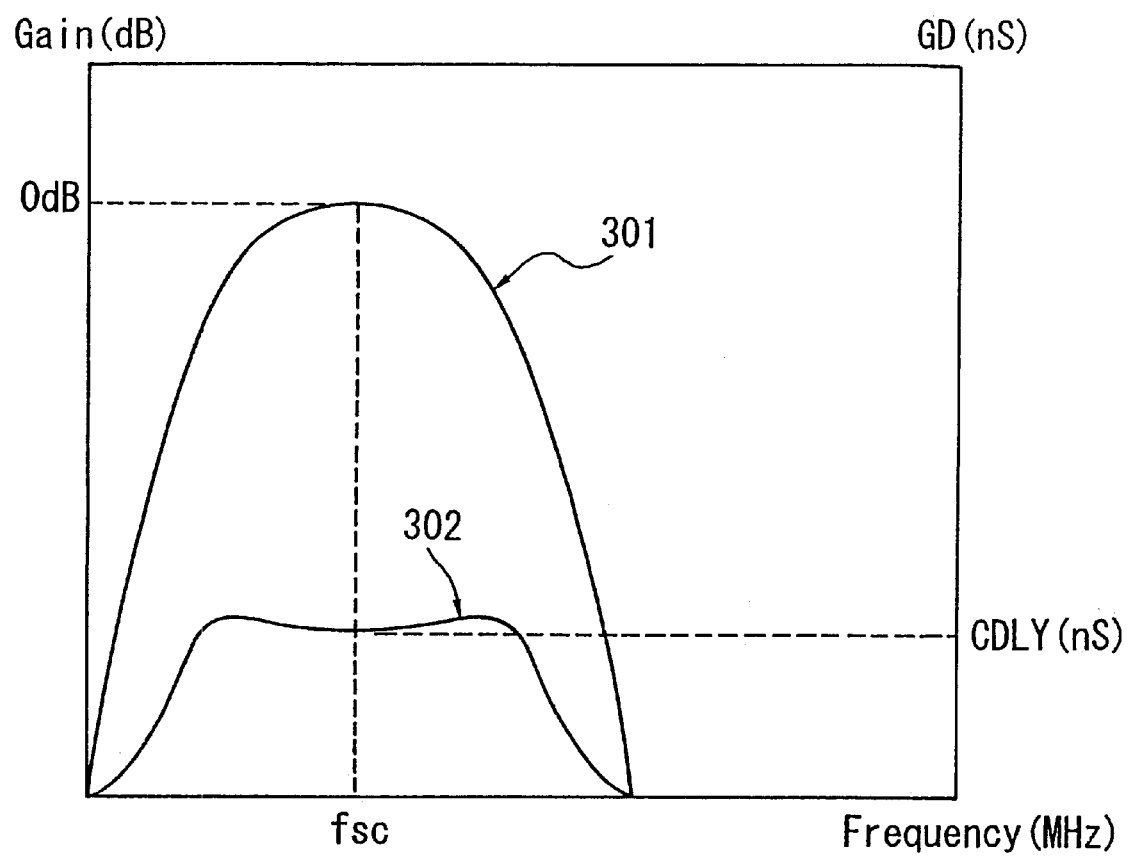
FIG. 4 is a graph showing the characteristic of a band-pass filter (BPF).

On the other hand, a chrominance signal 123A gain-controlled by the amplifier 122 is subjected to band limit by a BPF 123. FIG. 4 is a graph showing the characteristic of the BPF 123. Referring to FIG. 4, reference numeral 301 denotes an amplitude characteristic (Gain), and reference numeral 302 denotes a group delay characteristic (GD).

A chrominance signal in the NTSC system has fsc=3.58 MHz, and a chrominance signal in the PAL system has fsc=4.43 MHz. The in-band group delay time of the BPF 123 is CDLY (nS).

In the first embodiment, the group delay times of the LPF 103 and the BPF 123 are set to satisfy the following equation (1):

$$YDLY=(n\times 1/fs)+CDLY \quad (1)$$

where n is 1, 2, 3, . . . (natural number), and fs is a sampling clock frequency of the A/D converter.

For example, when the sampling clock frequency fs of the A/D converter 105 is given by fs=13.5 MHz, there is obtained 1/fs=74 nS. In this instance, the group delay times of the LPF 103 and the BPF 123 are set to satisfy YDLY= (3×1/13.5 MHz)+CDLY. In other words, the difference between the group delay times YDLY and CDLY is set to be three times a sampling clock period of 74 nS.

Subsequently, the Y signal 103B and a C signal 123B are inputted to the A/D converters 105 and 125 through the clamping circuits 104 and 124, respectively, to obtain digitized data 106 and 127 at a resolution of 8 bits.

Here, the resolution and conversion rate of the A/D converter 105 or 125 need not be particularly specified if the resolution and conversion rate are enough to achieve a predetermined object in actual use.

Figure 5:
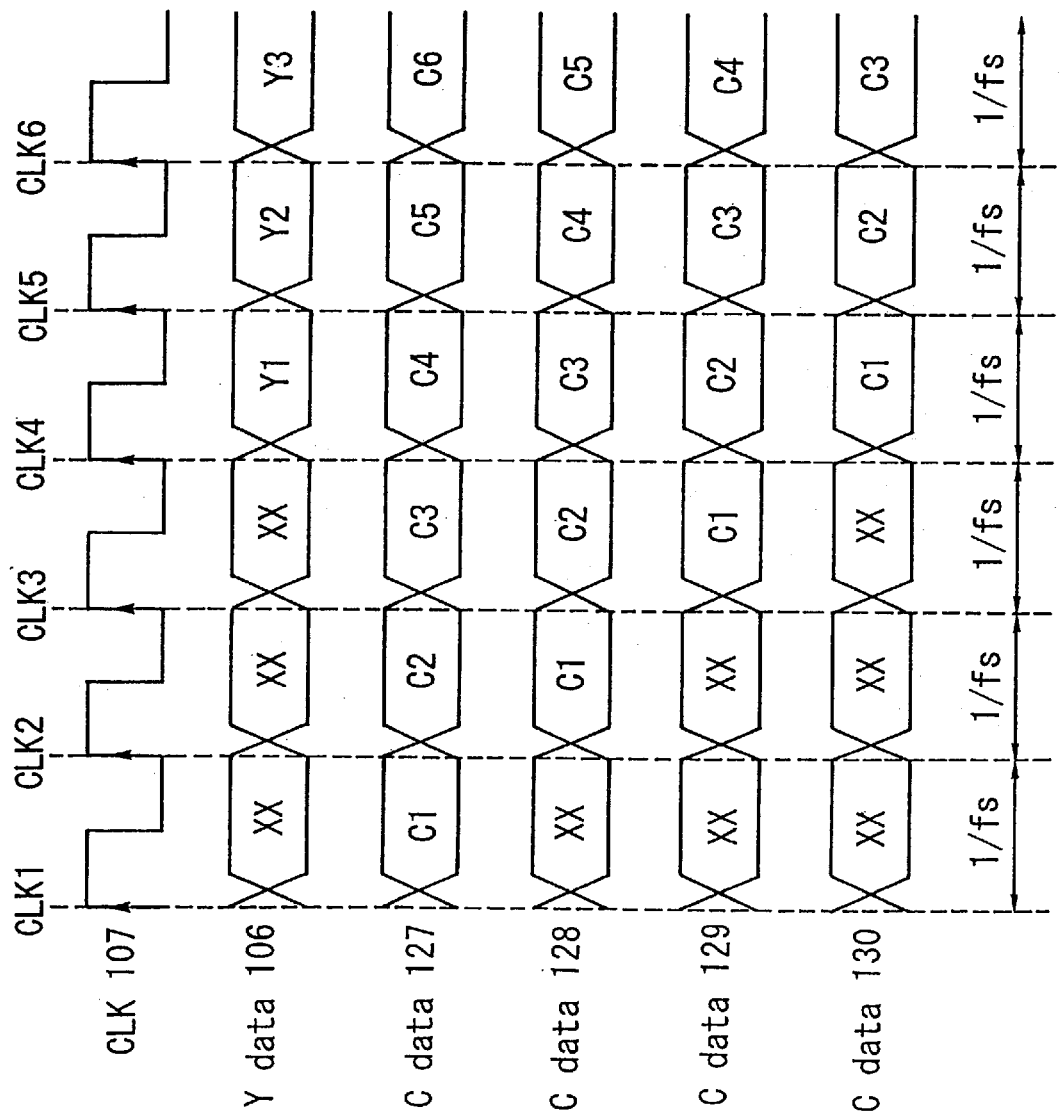
FIG. 5 is a timing chart showing digital data converted by A/D converters.

FIG. 5 is a timing chart showing digital data converted by the A/D converters 105 and 125. Referring to FIG. 5, in data sampled by a rise event of a clock signal 107, due to the group delay offset between the pre-filters, a C signal of the C data 127 advances by 3 clock periods with respect to a Y signal of the Y data 106. Here, by delaying the C signal 127 by means of a 3-clock shift register formed by connecting three flip-flops 126 in series with each other to produce the respective C data signals 128, 129 and 130, the timing of the Y data 106 and the timing of the C data 130 are made to coincide with each other at the timing of a clock CLK4.

Accordingly, an analog delay circuit need not be interposed for signal delay adjustment, and the delay timing of the luminance signal and the delay timing of the chrominance signal can be made equal to each other without any variation. Since no analog delay circuit is provided, low cost, space saving and a reduction in power consumption can be achieved.

Incidentally, although in the first embodiment described above, a BPF is used as a pre-filter for a C signal, an LPF may be used in place of the BPF.

[Second Embodiment]

Figure 6:
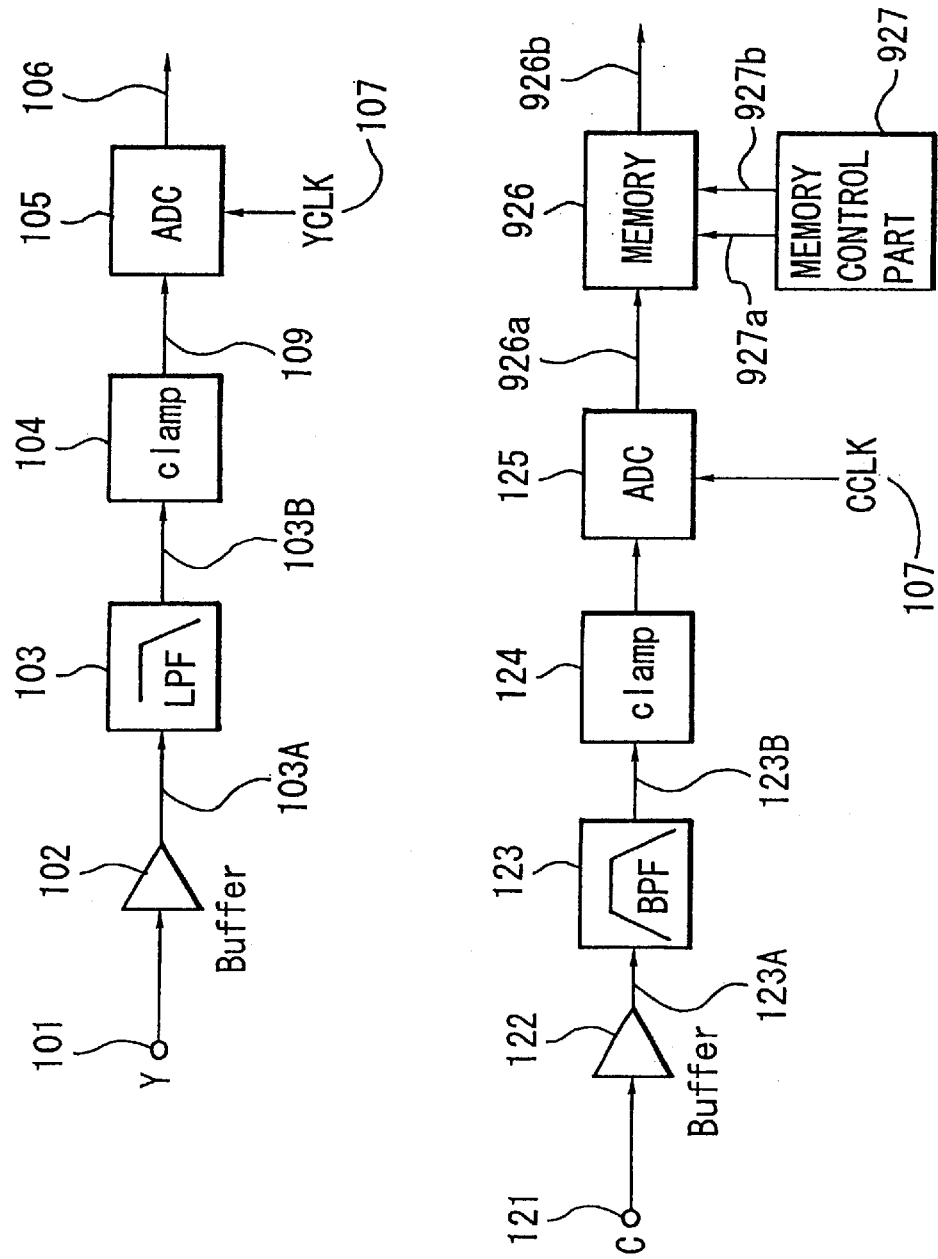
FIG. 6 is a block diagram showing the arrangement of a video signal processing apparatus according to a second embodiment of the present invention.

FIG. 6 is a block diagram showing the arrangement of a video signal processing apparatus according to a second embodiment of the present invention. The same reference numerals as in the first embodiment denote the same parts in the second embodiment, and a description thereof will be omitted. Referring to FIG. 6, reference numeral 926 denotes a memory, and reference numeral 927 denotes a memory control part.

The second embodiment has the following characteristic feature. That is, a timing delay operation for a C signal is performed by using a memory in place of the shift register in the first embodiment.

Referring to FIG. 6, the memory control part 927 controls the delay timing of a digital C signal 926a in accordance with a write control signal 927a and a read control signal 927b for the memory 926.

More specifically, the difference between the group delay time of a Y signal in the LPF 103 serving as an analog pre-filter and the group delay time of a C signal in the BPF 123 serving as an analog pre-filter is set to be integer times the period of the sampling clock signal 107. For this reason, the clock periods corresponding to the time difference are corrected by write and read operations of the memory 926, so that a Y signal 106 and a C signal 926b are controlled to have the same delay timing.

Accordingly, the same effect as that in the first embodiment can be obtained in the second embodiment. In addition, in the first embodiment, since the difference between the group delay time YDLY and the group delay time CDLY is set to be integer times a sampling clock period, D flip-flops whose number corresponding to the integer times must be connected in series with each other. However, in the second embodiment, the video signal processing apparatus can cope with arbitrary integer times of the sampling clock period without increasing parts in number.

[Third Embodiment]

Figure 7:
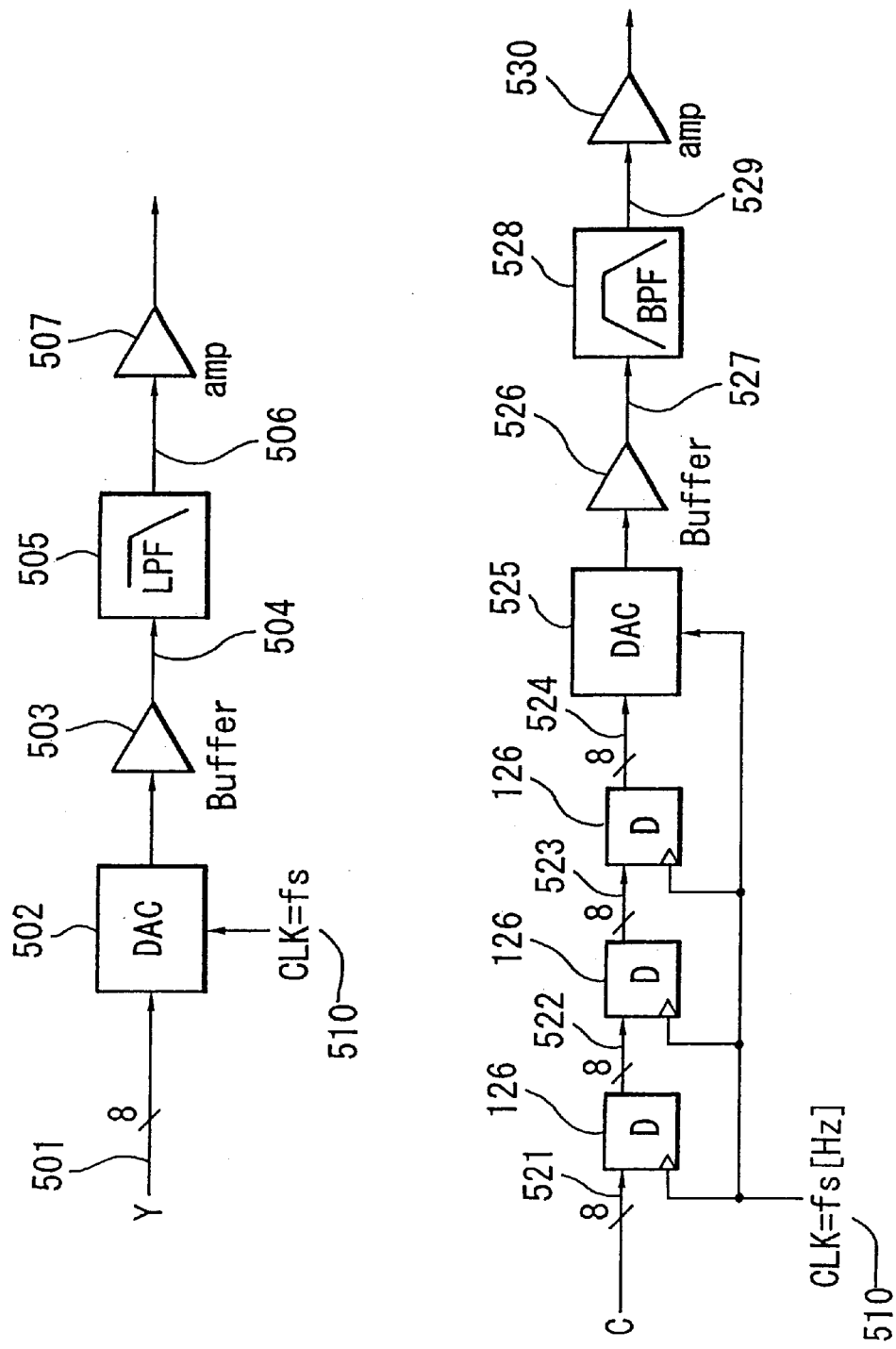
FIG. 7 is a block diagram showing the arrangement of a video signal processing apparatus according to a third embodiment of the present invention.

Next, the arrangement and operation of a reproduction unit of a video signal processing apparatus will be described below. FIG. 7 is a block diagram showing the arrangement of a video signal processing apparatus according to a third embodiment of the present invention. Referring to FIG. 7, reference numerals 502 and 525 denote D/A converters for re-sampling in accordance with a clock signal 510; 503 and 526, buffers; 505, an LPF; 528, a BPF; and 507 and 530, video output amplifiers.

Input signals 501 and 521 are 8-bit digital video data, i.e., a Y digital signal and a C digital signal, respectively. The clock signal 510 is supplied to the D/A converters 502 and 525 and D flip-flops 126, and the Y digital signal and the C digital signal are converted from digital signals to analog signals in synchronism with the clock signal 510.

Figure 8:
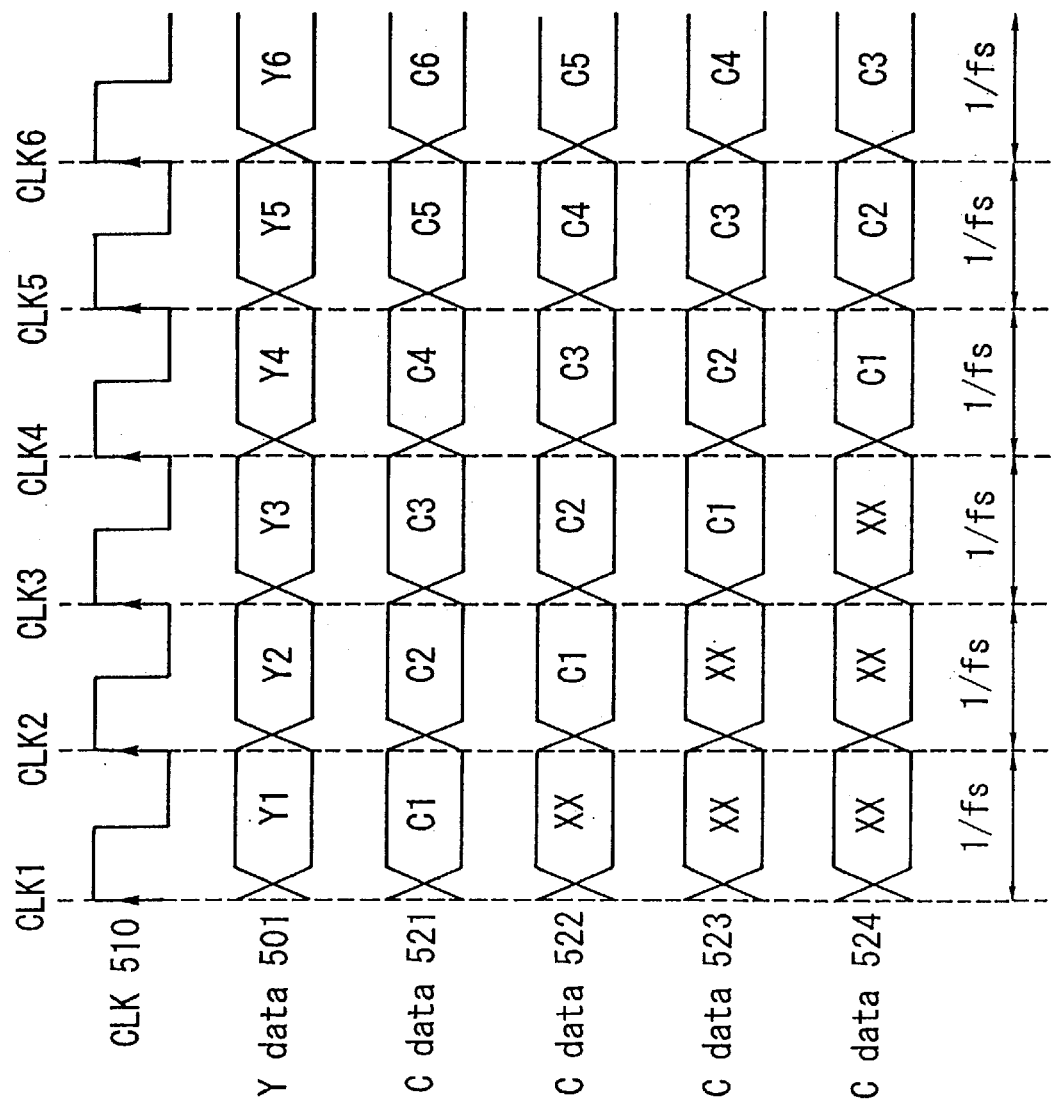
FIG. 8 is a timing chart showing a digital luminance signal and a digital chrominance signal when the digital signals are converted into analog signals.

FIG. 8 is a timing chart showing the digital Y signal and the digital C signals when the digital signals are converted into analog signals.

In the event of a clock CLK1, the Y data 501 and the C data 521 are inputted at the same timing, and the C data 521 is sequentially delayed by the D flip-flops 126 to produce respective C data 522, 523 and 524 As a result, C data 524 delayed by 3 clock periods can be obtained in the event of a clock CLK4. The difference between the signal delays of the Y data 501 and the C data 524 is obtained such that the C data 524 is delayed for 3/fs (nS) with respect to the Y data 501.

After that, the digital signals are converted into analog signals by the D/A converters 502 and 525, so that a Y signal 504 and a C signal 527 are obtained through the buffers 503 and 526, respectively.

In the buffers 503 and 526, processes such as impedance conversion and gain control are performed to supply the Y signal 504 and the C signal 527 subjected to the processes to the next stages. The difference between the timings of the Y signal 504 and the C signal 527 is substantially kept at a delay difference caused by a shift register formed by connecting three D flip-flops 126 in series with each other, i.e., 3/fs (nS).

The LPF 505 and the BPF 528 are arranged to suppress an aliasing noise component generated by D/A conversion. Group delay times in passing bands of these filters are set to satisfy the following equation (2):

$$YDLY=CDLY+(n \times 1/fs) \quad (2)$$

where n=1, 2, 3, . . . (natural number).

In FIG. 8, when the sampling clock frequency fs of each of the D/A converters 502 and 525 is given by fs=13.5 MHz, there is obtained 1/fs=74 nS. In this instance, the difference between the group delay times of the LPF 505 and the BPF 528 is set to satisfy YDLY=(3×1/13.5 MHz)+CDLY. In other words, the difference between the group delay times YDLY and CDLY is set to be three times a clock period. Accordingly, the delay timings of a Y signal 506 and a C signal 529 passing through the filters are made to coincide with each other.

After that, predetermined video output signals can be outputted and supplied to a television monitor or the like from the amplifiers 507 and 530.

Incidentally, in the third embodiment, although a BPF is used as a post-filter for a C signal, an LPF may be used in place of the BPF.

[Fourth Embodiment]

Figure 9:
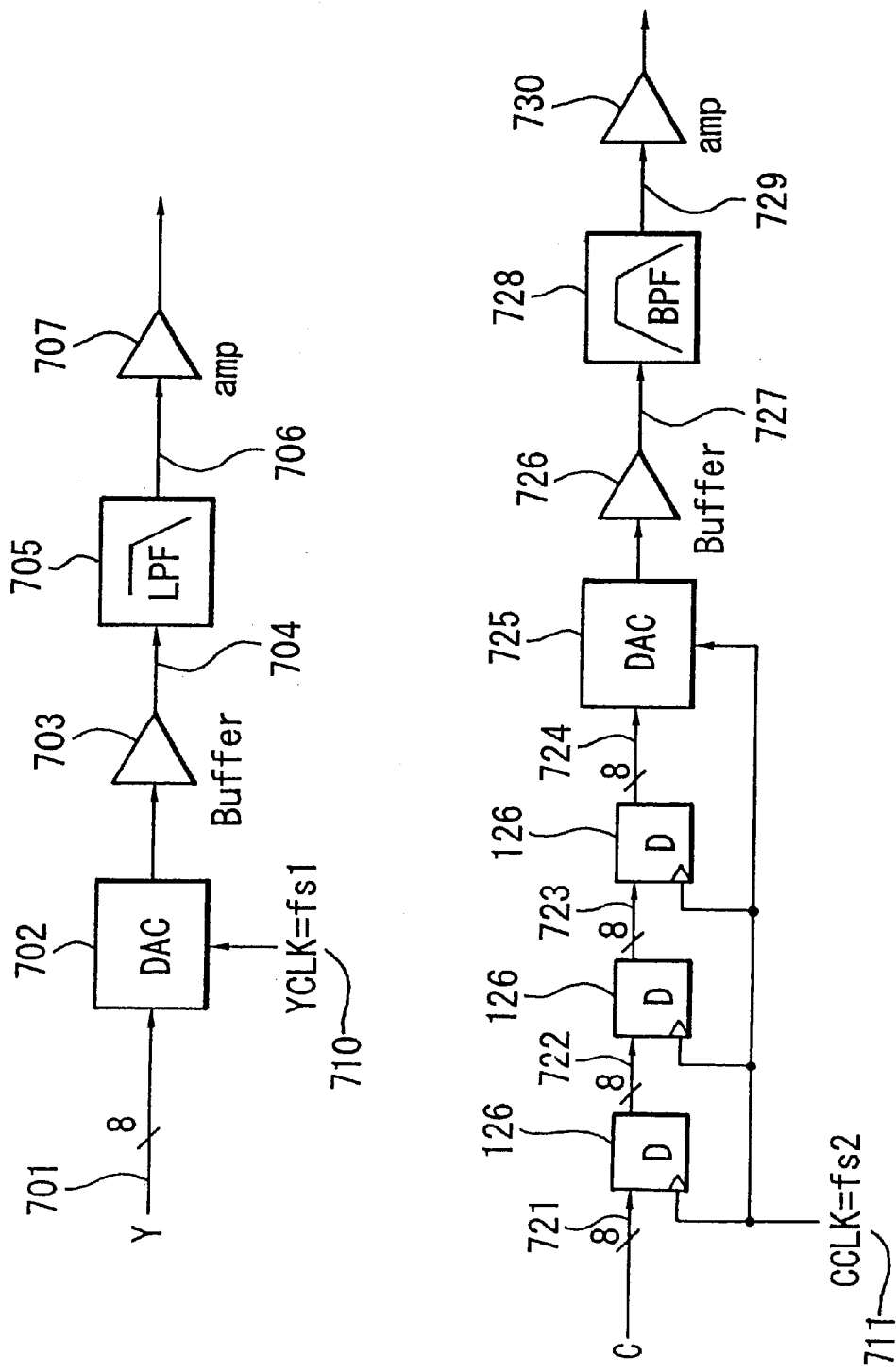
FIG. 9 is a block diagram showing the arrangement of a video signal processing apparatus according to a fourth embodiment of the present invention.

FIG. 9 is a block diagram showing the arrangement of a video signal processing apparatus according to a fourth embodiment of the present invention. The video signal processing apparatus according to the fourth embodiment has almost the same arrangement as that of the video signal processing apparatus according to the third embodiment (see FIG. 7). However, the video signal processing apparatus according to the fourth embodiment has a characteristic feature in that the clock frequency of a D/A converter for a Y signal is different from that of a D/A converter for a C signal.

Referring to FIG. 9, reference numeral 710 denotes a clock signal YCLK for a Y signal, and reference numeral 711 denotes a clock signal CCLK for a C signal. Input signals 701 and 721 are 8-bit digital video data, i.e., a digital Y signal and a digital C signal, respectively.

The clock signal 710 is supplied to a D/A converter 702, while the clock signal 711 is supplied to a D/A converter 725 and the D flip-flops 126, the latter flops producing respective C signals 722, 723 and 724, so that the digital Y signal 701 and the digital C signal 721 are converted to form digital signals into analog signals.

Figure 10:
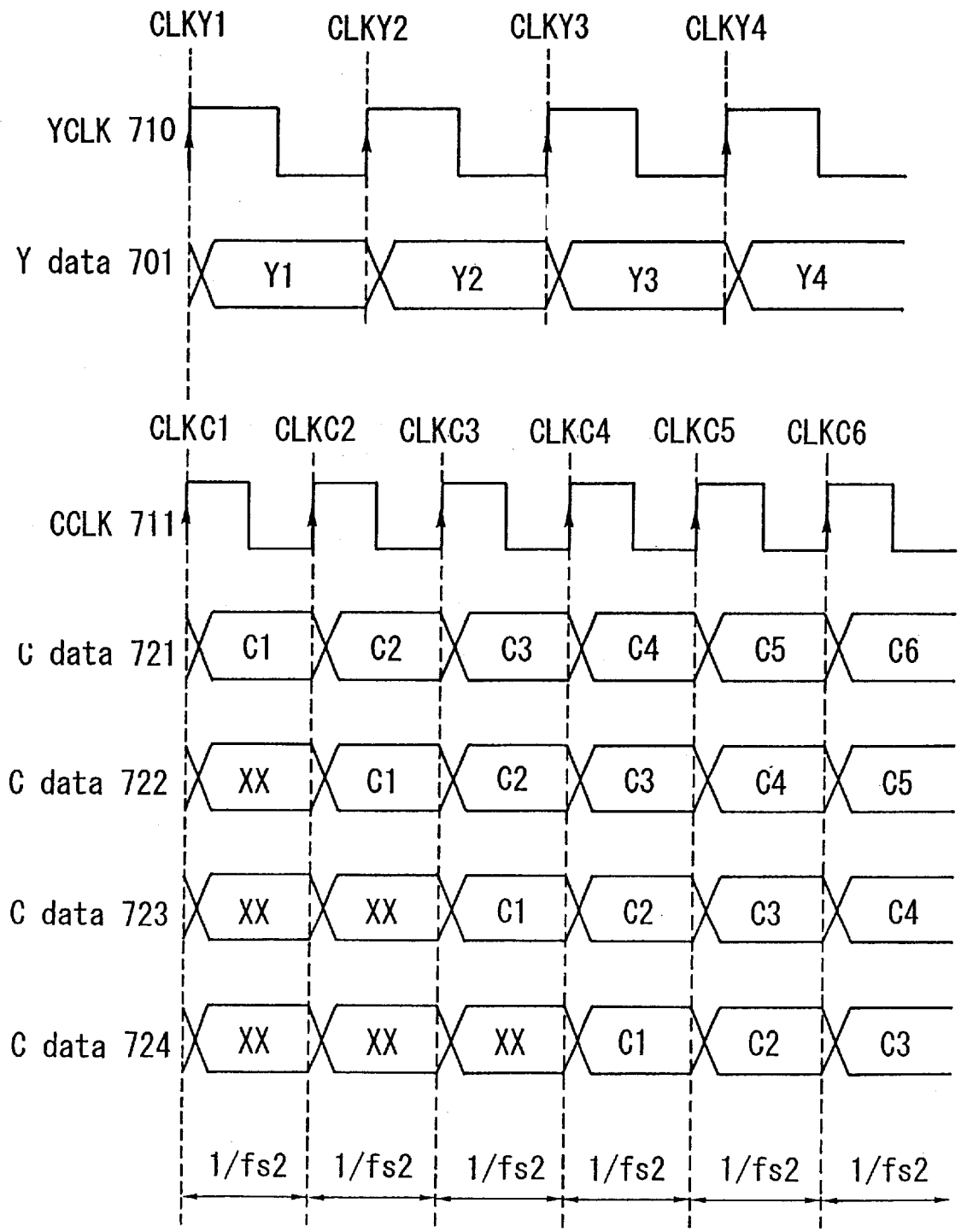
FIG. 10 is a timing chart showing a converting operation from digital signals into analog signals according to a clock signal for a luminance signal and a clock signal for a chrominance signal.

FIG. 10 is a timing chart showing the operations of the clock signal YCLK 710 for a Y signal and the clock signal CCLK 711 for a C signal when the digital signals are converted into analog signals. FIG. 10 shows the operations performed when the frequency of the clock signal YCLK 710 for a Y signal is given by fs1=13.5 MHz and the frequency of the clock signal CCLK 711 for a C signal is given by fs2=17.7 MHz.

The input digital signals are obtained in an event where CLKY1=CLKC1. After the Y data 701 and the C data 721 are inputted at the same timing, the C data 721 is sequentially delayed by the D flip-flops 126. AS a result, C data 724 delayed by 3 clock periods in the event of a clock CLKC4 can be obtained. Here, the difference between the signal delays of the Y data 701 and the C data 724 is obtained such that the C data 724 is delayed for 3/fs2 (nS) with respect to the Y data 701.

After that, the digital signals are converted into analog signals by the D/A converters 702 and 725, so that a Y signal 704 and a C signal 727 are obtained through the buffers 703 and 726, respectively.

In the buffers 703 and 726, processes such as impedance conversion and gain control are performed to supply the Y signal 704 and the C signal 727 subjected to the processes to the next stages. The difference between the timings of the Y signal 704 and the C signal 727 is substantially kept at a delay difference caused by a shift register formed by connecting three D flip-flops 126 in series with each other, i.e., 3/fs2 (nS).

The LPF 705 and the BPF 728 are arranged to suppress an aliasing noise component generated by D/A conversion. Group delay times in passing bands of these filters are set to satisfy the following equation (3):

$$YDLY=CLDY+(n \times 1/fs2) \quad (3)$$

where n=1, 2, 3, . . . (natural number).

In FIG. 10, the re-sampling clock frequency of the D/A converter for a Y signal is different from the re-sampling clock frequency of the D/A converter for a C signal. When the sampling clock frequency of the D/A converter for a C signal is given by fs2=17.7 MHz, there is obtained 1/fs2=56 nS. In this instance, the difference between the group delay times of the LPF 705 and the BPF 728 is set to satisfy YDLY=(3×1/17.7 MHz)+CDLY.

In other words, the difference between the group delay times YDLY and CDLY is set to be three times a clock period for the C signal. Accordingly, the delay timings of a Y signal 706 and a C signal 729 passing through the filters are made to coincide with each other. After that, predetermined video output signals can be outputted and supplied to a television monitor or the like from amplifiers 707 and 730.

Incidentally, in the fourth embodiment, although a BPF is used as a post-filter for a C signal, an LPF may be used in place of the BPF.

According to a video signal processing apparatus of the present invention, delay timings of a luminance signal and a chrominance signal can be easily matched at high precision.

Further, according to the present invention, the delay timings can be matched by using a sampling clock signal.

Furthermore, according to the present invention, a reduction in variation of the delay timings of a luminance signal and a chrominance signal and high precision of the delay timing can be achieved. In addition, high quality of a signal, e.g., an S/N ratio or the like, can be assured. Low cost, space saving and a reduction in power consumption can also be achieved.

As has been described above, the group delay time difference between a luminance signal and a chrominance signal set by an analog section can be corrected by a digital section with respect to timing, and a low-cost analog pre-filter, space saving, a reduction in power consumption when an analog pre-filter is constituted by an active filter such as an IC, a reduction in variation of setting of Y and C signal delay timings, and high precision of the signal delay timings can be achieved.

Furthermore, a low-cost analog post-filter, space saving, a reduction in power consumption when an analog post-filter is constituted by an active filter such as an IC, a reduction in variation of setting of Y and C signal delay timings, and high precision of the signal delay timings can be achieved.

According to the present invention, low cost, space saving, and a reduction in power consumption when an active filter such as an IC is arranged can be achieved.

According to the present invention, even if parts are not added in accordance with a group delay time difference depending on integer times of a sampling clock period, delay timings can be matched with respect to an arbitrary group delay time difference. Therefore, the degree of freedom of design can be improved.

What is claimed is:

1. A video signal processing apparatus comprising:

first frequency band limiting means for limiting a frequency band of an analog luminance component signal and outputting a frequency-band-limited analog luminance component signal;

second frequency band limiting means for limiting a frequency band of an analog chrominance component signal and outputting a frequency-band-limited analog chrominance component signal, said second frequency band limiting means having a group delay characteristic different from a group delay characteristic of said first frequency band limiting means;

first analog/digital conversion means for converting the frequency-band-limited analog luminance component signal into a first digital signal;

second analog/digital conversion means for converting the frequency-band-limited analog chrominance component signal into a second digital signal; and, timing adjustment means for adjusting a timing of the second digital signal to match with first digital signal.

2. A video signal processing apparatus according to claim 1, wherein said first analog/digital conversion means is arranged to convert in accordance with a sampling clock signal having a predetermined frequency, and also wherein said second analog/digital conversion means is arranged to convert in accordance with the sampling clock signal, and wherein a difference in delay time caused by a difference in group delay characteristic between said first frequency band limiting means and said second frequency band limiting means is integer times a period of the sampling clock signal.

3. A video signal processing apparatus according to claim 2, wherein said timing adjustment means includes delay means having a delay time corresponding to integer times of the period of the sampling clock signal, for correcting the difference in delay time between the first digital signal and the second digital signal caused by the difference in group delay characteristic between said first frequency band limiting means and second frequency band limiting means.

4. A video signal processing apparatus according to claim 2, wherein said timing adjustment means includes a plurality of shift registers connected in series with each other and arranged to shift data in accordance with the sampling clock signal, for correcting the difference in delay time between the first digital signal and the second digital signal caused by the difference in group delay characteristic between said first frequency band limiting means and said second frequency band limiting means.

5. A video signal processing apparatus according to claim 2, wherein said timing adjustment means includes a memory arranged to write and read data in accordance with the sampling clock signal, for correcting the difference in delay time between the first digital and the second digital signal caused by the difference in group delay characteristic between said first frequency band limiting means and said second frequency band limiting means.

6. A video signal processing apparatus, comprising:

digital signal processing means for processing a digital chrominance component signal and outputting a processed digital chrominance component signal;

first digital/analog conversion means for converting a digital luminance component signal into an analog luminance component signal;

second digital/analog conversion means for converting the processed digital chrominance component signal into an analog chrominance component signal;

first frequency band ling means for limiting a frequency band of the analog luminance component signal and outputting a frequency band limited analog luminance component signal; and, second frequency band limiting means for limiting a frequency band of the analog chrominance component signal and outputting a frequency-band-limited analog chrominance component signal, said second frequency band limiting means having a group delay characteristic different from a group delay characteristic of said first frequency band limiting means;

wherein said digital signal processing means performs a predetermined process on the digital chrominance component signal so as to synchronize a timing of the frequency-band-limited analog chrominance component signal with a timing of the frequency-band-limited analog luminance component signal.

7. A video signal processing apparatus according to claim 6, wherein said first digital/analog conversion means is arranged to convert in accordance with a sampling clock signal having a predetermined frequency, and also wherein said second digital/analog conversion means is arranged to convert in accordance with the sampling clock signal, and wherein a difference in delay time caused by a difference in group delay characteristic between said first frequency band limiting means and said second frequency band limiting means is an integer times a period of the sampling clock signal.

8. A video signal processing apparatus according to claim 7, wherein said digital signal processing means includes delay means having a delay time corresponding to integer times of the period of the sampling clock signal, for correcting the difference in delay time between the analog luminance component signal and the analog chrominance component signal caused by the difference in group delay characteristic between said first frequency band limiting means and said second frequency band limiting means.

9. A video signal processing apparatus according to claim 7, wherein said digital signal processing means includes a plurality of shift registers connected in series with each other and arranged to shift data in accordance with the sampling clock signal, for correcting the difference in delay time between the analog luminance component signal and the analog chrominance component signal caused by the difference in group delay characteristic between said first frequency band limiting means and said second frequency band limiting means.

10. A video signal processing apparatus according to claim 6, wherein said first digital/analog conversion means is arranged to convert in accordance with a first sampling clock signal having a predetermined frequency, and wherein said second digital/analog conversion means is arranged to convert in accordance with a second sampling clock signal having a predetermined frequency different from the first sampling clock signal, and wherein a difference in delay time caused by a difference in group delay characteristic between said first frequency band limiting means and said second frequency band limiting means is integer times a period of the second sampling clock signal.

* * * * *

UNITED STATES PATENT AND TRADEMARK OFFICE
CERTIFICATE OF CORRECTION

PATENT NO.      : 6,400,412 B1
DATED           : June 4, 2002
INVENTOR(S)   : Toshihiko Suzuki It is certified that error appears in the above-identified patent and that said Letters Patent is hereby corrected as shown below:

Column 1,
Line 41, delete "½ is" and insert -- ½ $f_5$ --.

Column 7,
Line 4, after "524" (first occurrence) insert -- . --.
Line 64, delete "latter flops" and insert -- latter flip-flops --.

Column 8,
Line 12, delete "AS" and insert -- As --.

Signed and Sealed this

Ninth Day of September, 2003

JAMES E. ROGAN
*Director of the United States Patent and Trademark Office*